(12) United States Patent
Kaneko et al.

(10) Patent No.: US 7,548,862 B2
(45) Date of Patent: Jun. 16, 2009

(54) AUDIO-VISUAL APPARATUS WITH A VOICE RECOGNITION FUNCTION

(75) Inventors: Mayumi Kaneko, Daito (JP); Toshihiro Takagi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 491 days.

(21) Appl. No.: 11/455,655

(22) Filed: Jun. 20, 2006

(65) Prior Publication Data

US 2006/0287869 A1 Dec. 21, 2006

(30) Foreign Application Priority Data

Jun. 20, 2005 (JP) ............................. 2005-179443

(51) Int. Cl.
*G10L 21/00* (2006.01)
(52) U.S. Cl. .................................................... 704/275
(58) Field of Classification Search ................. 704/270, 704/275
See application file for complete search history.

(56) References Cited

U.S. PATENT DOCUMENTS

| | | | | |
|---|---|---|---|---|
| 5,086,385 | A * | 2/1992 | Launey et al. ............... | 700/83 |
| 5,247,580 | A * | 9/1993 | Kimura et al. .............. | 704/275 |
| 5,267,323 | A * | 11/1993 | Kimura ..................... | 381/110 |
| 6,606,280 | B1 * | 8/2003 | Knittel ...................... | 367/198 |
| 6,889,191 | B2 * | 5/2005 | Rodriguez et al. .......... | 704/275 |
| 7,006,974 | B2 * | 2/2006 | Burchard et al. ............ | 704/275 |
| 7,260,538 | B2 * | 8/2007 | Calderone et al. .......... | 704/275 |
| 7,293,276 | B2 * | 11/2007 | Phillips et al. ............... | 725/42 |
| 2005/0027539 | A1 * | 2/2005 | Weber et al. ................ | 704/275 |
| 2005/0144009 | A1 * | 6/2005 | Rodriguez et al. .......... | 704/275 |

FOREIGN PATENT DOCUMENTS

JP 08-202690 7/1994

* cited by examiner

*Primary Examiner*—Michael N Opsasnick
(74) *Attorney, Agent, or Firm*—Pillsbury Winthrop Shaw Pittman, LLP

(57) ABSTRACT

An audio-visual apparatus includes a voice input section, and a voice recognition section configured to recognize the voices inputted from the voice input section. The audio-visual apparatus also includes a control section configured to instruct components of the apparatus body to perform respective operations for executing a command according to a voice recognized by the voice recognition section, and a storage section. The control section records in the storage section last settings of the apparatus body that are active before the execution of the command and then executes the command. When a specified code associated with a voice representing an UNDO command for undoing the former command is received after the execution of the command, the control section instructs the components of the apparatus body to perform respective UNDO operations for restoring the last settings stored in the storage section from the current settings of the apparatus body.

5 Claims, 13 Drawing Sheets

FIG. 1
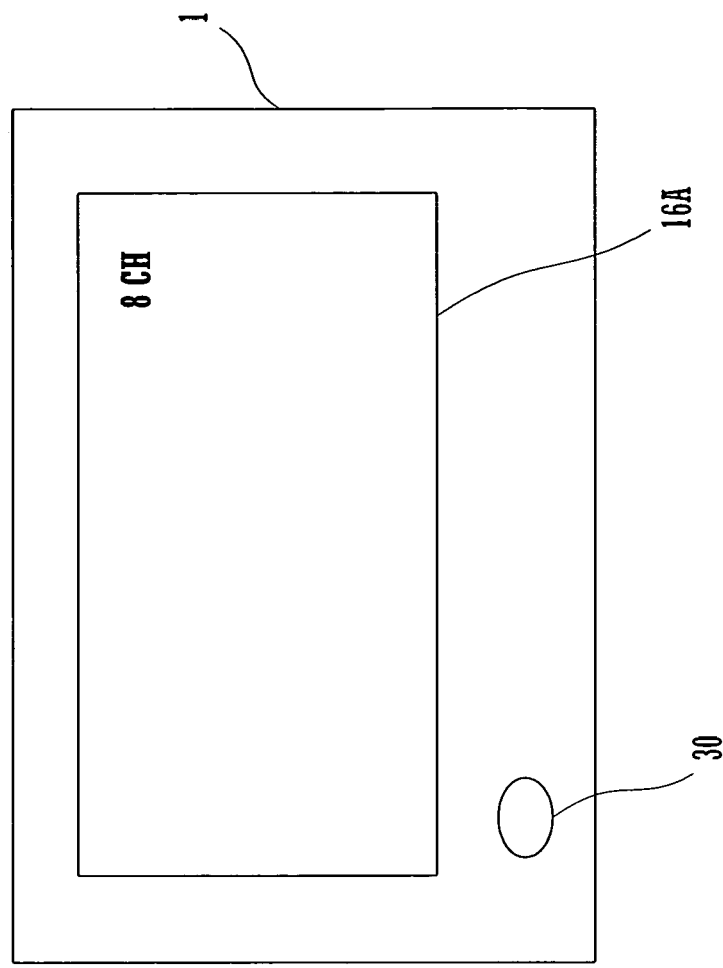
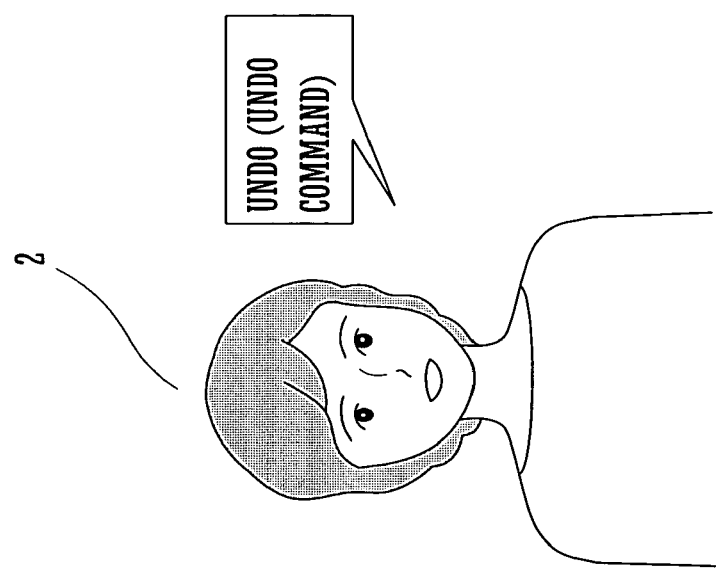

FIG. 3

| WORD | SPECIAL CODE |
|---|---|
| UNDO | 0000000111 |

34

| WORD | CONTROL CODE |
|---|---|
| POWER | 1100000011 |
| CHANNEL 1 | 1100000111 |
| CHANNEL 2 | 1100001111 |
| --- | --- |

FIG. 7

| WORD | SPECIAL CODE |
|---|---|
| UNDO | 0000000111 |

44

| WORD | CONTROL CODE |
|---|---|
| POWER ON/OFF | 1110000011 |
| REPLAY | 1110000111 |
| FAST FORWARD | 1110001111 |
| RECORDING | 1110011111 |
| STOP | 1110111111 |
| ---- | ---- |

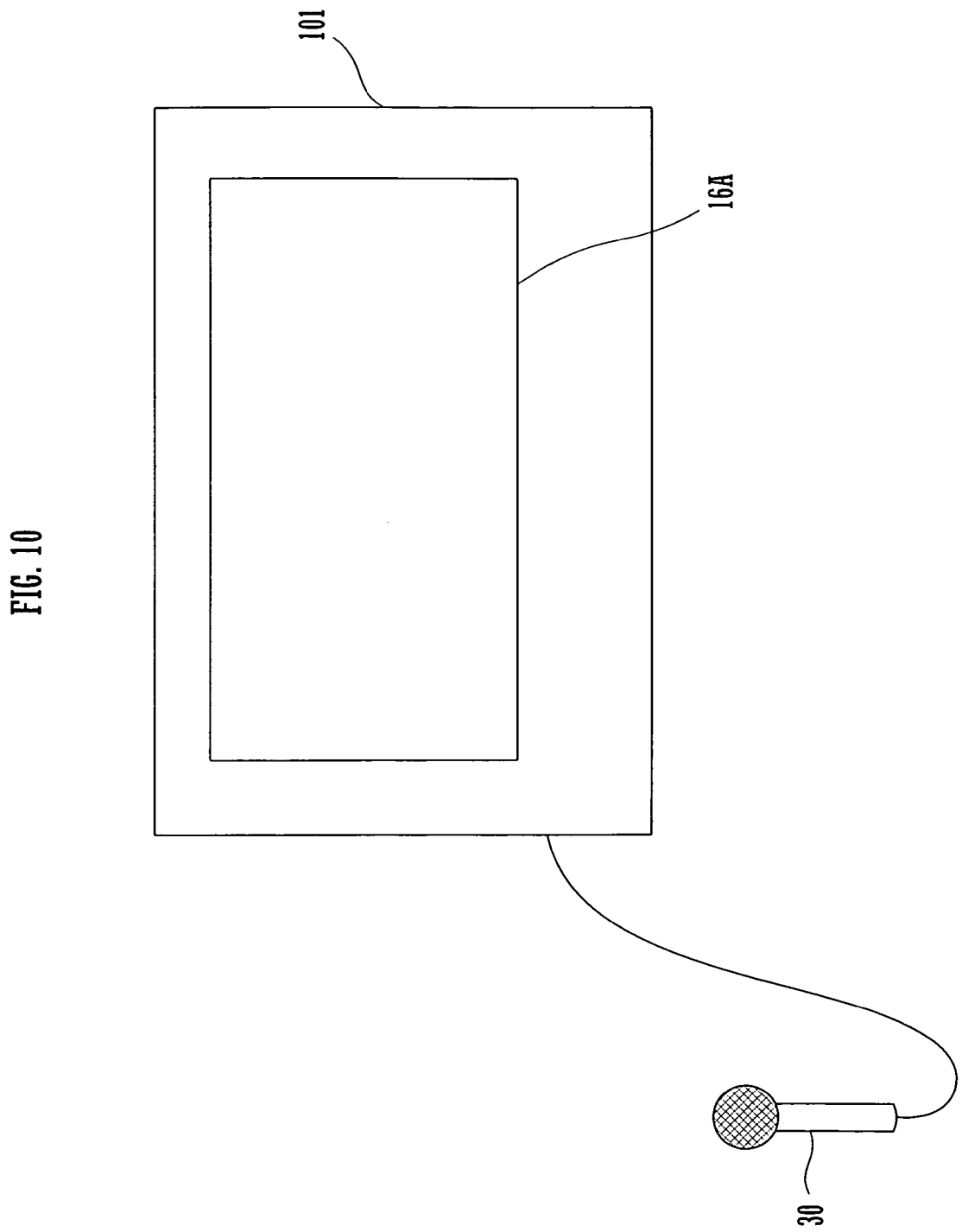

AUDIO-VISUAL APPARATUS WITH A VOICE RECOGNITION FUNCTION

CROSS REFERENCE

This Nonprovisional application claims priority under 35 U.S.C. § 119(a) on Patent Application No. 2005-179443 filed in Japan on Jun. 20, 2005, the entire contents of which are hereby incorporated by reference.

BACKGROUND OF THE INVENTION

The present invention relates to AV (Audio-Visual) apparatus including television receivers, optical disk devices and hard disk recorders (hereinafter will be referred to as HDRs) and, more particularly, an AV apparatus with a voice recognition function which is capable of recognizing voices of a user and controlling the apparatus body based on the voices.

The voice recognition technology for recognizing voices inputted includes the technique of extracting a word-like portion of a voice being uttered, which is so-called word spotting, the technique of recognizing successive voices by using HMM (Hidden Marcov Model), and like techniques.

Conventionally widespread AV apparatus are generally provided with an infrared wireless remote controller for remote control of such an AV apparatus. Existing AV apparatus of another type adopt the aforementioned voice recognition technology for remote control by voices. Representatives of such AV apparatus with the voice recognition function include the following television receiver, optical disk device and HDR.

For example, when the user utters a voice representing a command to power ON/OFF, change channels or adjust the sound volume or a like command, the television receiver receives the voice by means of a microphone or the like and recognizes the voice. Then, the television receiver executes the command to power ON/OFF, change channels or adjust the sound volume or the like command according to the voice recognized.

In the case of the optical disk device or the HDR, when the user utters a voice representing a command to perform a trick play such as replay, fast forward or reverse or a like command, the optical disk device or the HDR receives the voice by means of a microphone or the like and recognizes the voice. Then, the optical disk device or the HDR executes the command to perform replay, fast forward or reverse or a like command according to the voice recognized.

On the other side, an audio apparatus controller with a voice recognition function has been proposed as described in Japanese Patent Laid-Open Publication No. HEI 6-202690. This audio apparatus controller includes a control section configured to determine whether or not a command represented by a voice recognized is suited to a current operation status of the audio apparatus. The audio apparatus is a CD player for example. The control section executes a command only when it is determined that the command representing a voice recognized is suited to the current operation status of the audio apparatus.

The aforementioned voice recognition technology, however, generally has a high possibility of failure in recognizing voices.

For this reason, with the aforementioned conventional AV apparatus with the voice recognition function, it is possible that the apparatus mistakes the command uttered by the user for another by erroneous recognition and executes the wrong command. In the case of a television receiver for example, it is possible that the current channel is changed to channel 8 in spite of a command given by the user to increase the sound volume. In the case of an optical disk device or a HDR, it is possible that reverse is performed in spite of a command given by the user to perform replay.

When the wrong command is executed, the user has to recall a last setting in order to correct the wrong command and utter a command to restore the last setting. Here, settings of the television receiver are meant to include a channel setting, sound volume setting, and the like. Settings of the optical disk device or HDR are meant to include settings for trick plays, a location on the medium at which a trick play setting is active currently, and the like.

In this case, the user has to seek the last setting because the user seldom bears the last setting in mind. In the case of the television receiver for example, the user has to seek a last channel setting by changing channels sequentially. In the case of the optical disk device or HDR, the user has to seek a last setting to find out the last location on the medium by fast-forwarding with the last image or the like as a clue.

In addition, even when the user utters a command to restore the last setting, it is possible that the apparatus again fails to recognize the voice representing that command.

As described above, any one of the conventional AV apparatus with the voice recognition function has made the user feel troublesome in restoring a last setting.

In the case of the audio apparatus controller with the voice recognition function described in the aforenoted Japanese Patent Laid-Open Publication No. HEI 6-202690, even if a command represented by a voice recognized is suited to a current operation status of the audio apparatus, the voice recognized does not necessarily meet the command intended by the user. Therefore, it is possible that a command not intended by the user is executed. For this reason, like the above-described conventional AV apparatus with the voice recognition function, the audio apparatus controller with the voice recognition function has made the user feel troublesome.

A feature of the present invention is to provide an AV apparatus with a voice recognition function which is capable of restoring a last setting easily.

SUMMARY OF THE INVENTION

An audio-visual (AV) apparatus with a voice recognition function according to the present invention includes a voice input section to which voices are inputted, and a voice recognition section configured to recognize the voices. The voice input section comprises a microphone for example. The AV apparatus is a television receiver, an optical disk device or a HDR for example.

The AV apparatus also includes: a code storage section having prestored therein a control code associated with a voice representing a command to control an apparatus body, and a specified code associated with a voice representing an UNDO command to undo the command; and a recognized voice processing section configured to fetch the control code or the specified code associated with the voice recognized by the voice recognition section from the code storage section and output the control code or the specified code thus fetched. Preferably, the UNDO command is such a simple word that can easily be voice-recognized correctly without failure. For example, such a simple word is "UNDO".

The AV apparatus with the voice recognition function further includes: a control section configured to instruct components of the apparatus body to perform respective operations for executing the command according to the control code associated therewith upon receipt of the control code outputted from the recognized voice processing section; and a settings storage section configured to store therein settings of the apparatus body.

The control section records in the settings storage section settings of the apparatus body that are active before the execution of the command as last settings before command execution and then executes the command. When the specified code outputted from the recognized voice processing section is received after execution of the command, the control section instructs the components of the apparatus body to perform respective UNDO operations for restoring the last settings stored in the settings storage section from the current settings of the apparatus body.

This configuration accommodates to cases where the AV apparatus with the voice recognition function mistakes a command uttered by the user for another command by erroneous recognition and executes the wrong command.

In such a case, the user utters "UNDO" as the UNDO command. In response to the UNDO command received, the AV apparatus restores the last settings that have been active before the execution of the wrong command from the current settings.

The foregoing and other features and attendant advantages of the present invention will become apparent from the reading of the following detailed description of the preferred embodiments in conjunction with the accompanying drawings.

BRIEF DESCRIPTION OF THE DRAWINGS

FIG. 1 is a conceptual view illustrating a state where the user utters "UNDO" as the UNDO command with respect to a digital television receiver that has mistaken a command from the user for a wrong command by erroneous recognition;

FIG. 3 is a table showing correspondences between words stored in a storage section 34 and control codes associated with the respective words;

FIG. 7 is a table showing correspondences between words stored in a storage section 44 and control codes associated with the respective words;

FIG. 10 is a view showing the outward appearance of a digital television receiver according to a third embodiment of the present invention;

DETAILED DESCRIPTION OF THE PREFERRED EMBODIMENTS

Figure 2:
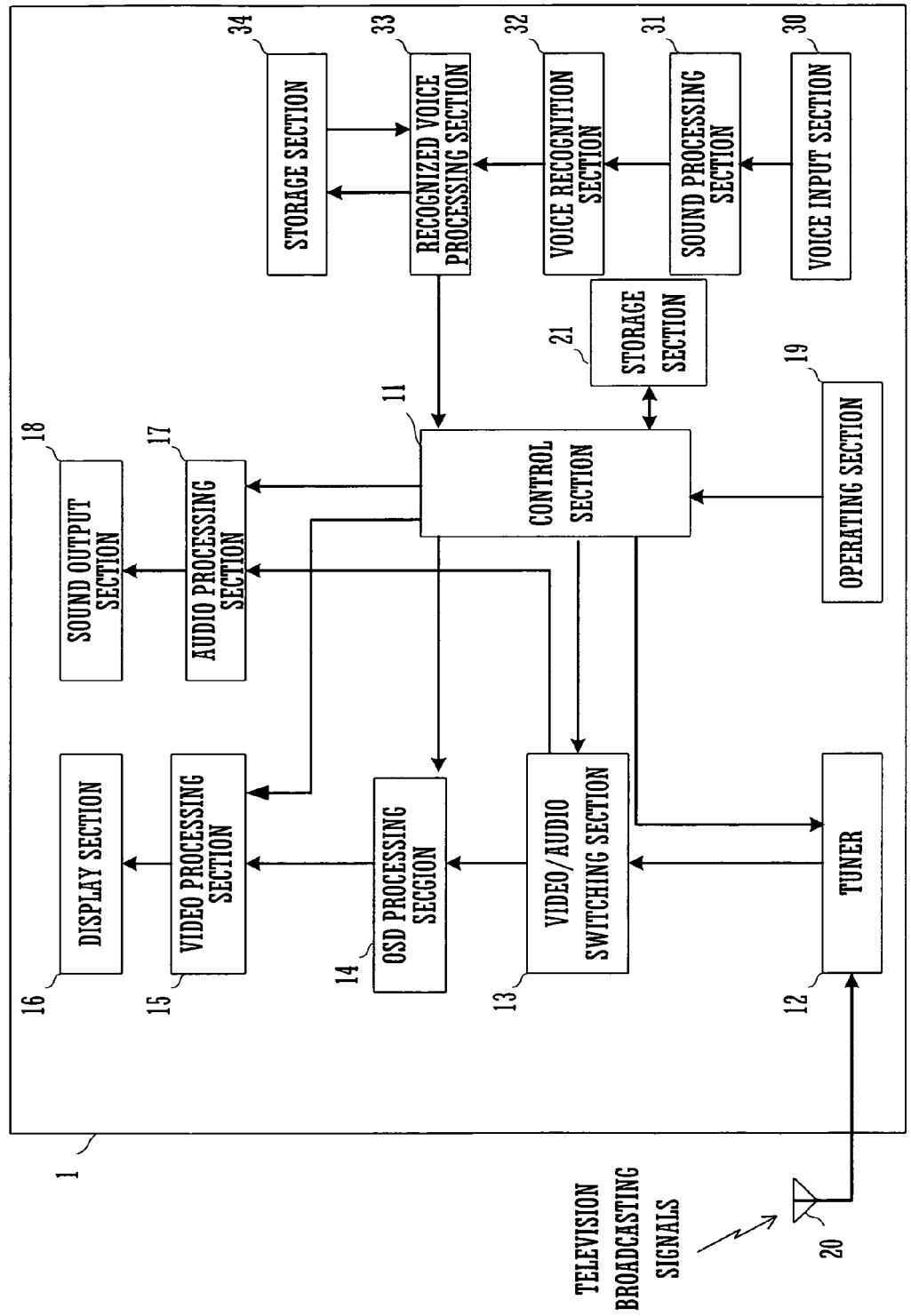
FIG. 2 is a block diagram showing a basic configuration of a digital television receiver according to a first embodiment of the present invention.

Hereinafter, a digital television receiver according to the first embodiment of the present invention will be described in detail.

FIG. 1 is a conceptual view illustrating a state where the user utters "UNDO" as the UNDO command with respect to a digital television receiver that has mistaken a command from the user for a wrong command by erroneous recognition.

A digital television receiver (hereinafter will be referred to as D-TV receiver) 1 includes a CRT 16A configured to display video images, and a voice input section 30 comprising a microphone or the like for receiving voices.

In FIG. 1, the selected channel of D-TV receiver 1 has been erroneously changed to channel 8 from channel 6 selected according to the last channel setting by erroneous recognition of a command given by the user 2 to increase the sound volume.

Then, the user 2 utters "UNDO" as an UNDO command. In response to the UNDO command received, the D-TV receiver 1 puts back the current setting (channel 8) to the last setting (channel 6).

In response to the UNDO command merely uttered by the user in this way, the D-TV receiver 1 restores the last setting easily. The flow of this operation will be described below.

FIG. 2 is a block diagram showing a basic configuration of the digital television receiver according to the first embodiment of the present invention.

The D-TV receiver 1 also includes a control section 11 configured to control the entire D-TV receiver 1, a tuner 12, a video/audio switching section 13, an OSD processing section 14, a video processing section 15, a display section 16, an audio processing section 17, a sound output section 18, an operating section 19, and a storage section 21 as a settings storage section.

The D-TV receiver 1 further includes a voice input section 30, a sound processing section 31, a voice recognition section 32, a recognized voice processing section 33, and a storage section 34 as a code storage section.

The control section 11 comprises a microcomputer for example.

Upon receipt of a command to power ON/OFF, change channels or adjust a sound volume or a like command inputted to the operating section 19, the operating section 19 transfers the command to the control section 11.

The tuner 12 extracts television broadcasting signals on a currently selected channel from all the television broadcasting signals received through an antenna 20 and then outputs the signals thus extracted.

The video/audio switching section 13 extracts video signals, audio signals and an electronic program guide (EPG) from the television signals outputted from the tuner 12 separately from each other, and decodes and outputs each type of signals. The television broadcasting signals outputted from the tuner 12 are signals compressed by means of MPEG 2 for example.

The video signals outputted from the video/audio switching section 13 are inputted to the video processing section 15 via the OSD processing section 14.

The OSD processing section 14 superimposes a character (letter) or a figure on the video signals according to a control signal transferred from the control section 11.

The video processing section 15, which has a D/A converter circuit for converting video signals outputted from the video/audio switching section 13 to analog video signals, outputs such video signals thus converted.

The display section 16 processes the video signals outputted from the video processing section 15 and displays a corresponding video image on the CRT 16A. Such video images include, in addition to video images provided by television programs, an OSD image such as "CHANNEL 8" shown in FIG. 1, and the aforementioned electronic program guide.

The audio processing section 17, which has a D/A converter circuit for converting audio signals outputted from the video/audio switching section 13 to analog audio signals, outputs such audio signals thus converted.

The sound output section 18 processes the audio signals outputted from the audio processing section 17 and then generates sounds to the exterior. The sound output section 18 comprises a speaker for example.

On the other side, the voice input section 30 is capable of receiving voices uttered by the user and comprises a microphone for example. When a voice uttered by the user or sound comprising ambient noises is inputted to the voice input section 30, the voice input section 30 converts such sound or voice to audio signals and then outputs these audio signals to the sound processing section 31.

The sound processing section 31 eliminates noises from the audio signals outputted from the voice input section 30 by noise canceling and then outputs the thus noise-eliminated audio signals to the voice recognition section 32.

The voice recognition section 32 performs voice recognition by using the audio signals outputted from the sound processing section 31 and then outputs a word (data) corresponding to the recognized voice to the recognized voice processing section 33.

FIG. 3 is a table showing correspondences between words stored in the storage section 34 and control codes associated with the respective words.

The storage section 34 comprises ROM for example.

The storage section 34 has stored therein correspondences between words and their respective associated control codes in a table form. Specifically, the storage section 34 has pre-stored therein control codes associated with respective of voices (words) each representing a command such as to power ON/OFF, change channels or adjust the sound volume or a like command. The storage section 34 has further pre-stored therein a special code associated with a voice (word "UNDO") representing the UNDO command to undo the former command.

In this embodiment, the special code are equivalent to the specified code defined by the present invention.

The recognized voice processing section 33 searches the table stored in the storage section 34 for the control code associated with the word (data) outputted from the voice recognition section 32, fetches the control code, and outputs the code thus fetched. If the word outputted from the voice recognition section 32 is "Channel One", the recognized voice processing section 33 fetches and outputs the control code "1100000111". Alternatively, if the word outputted from the voice recognition section 32 is "UNDO", the recognized voice processing section 33 fetches and outputs the special code "0000000111".

While this embodiment uses the word "UNDO" as the UNDO command, it is possible to use any simple word that can be voice-recognized easily without failure.

Figure 4:
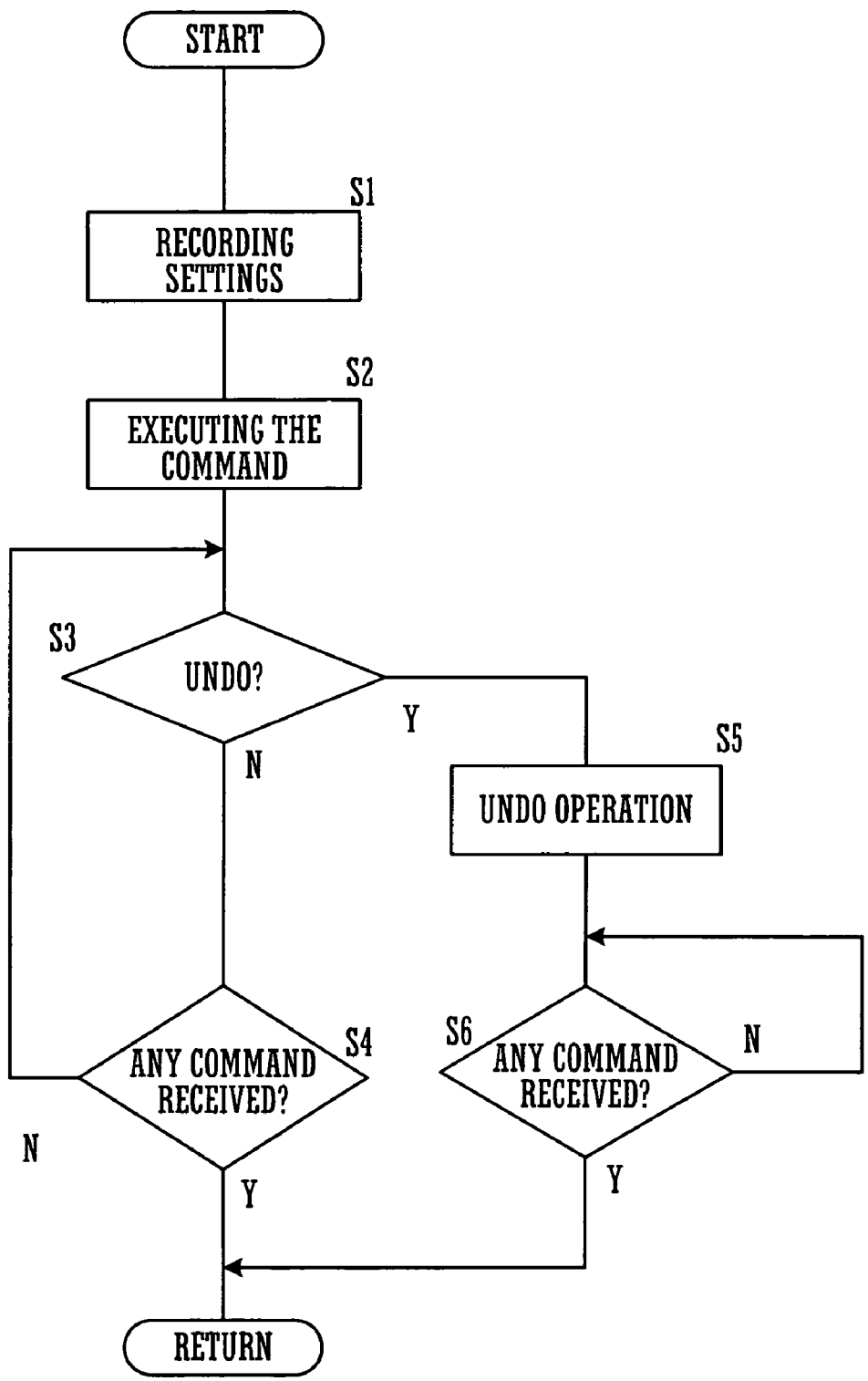
FIG. 4 is a flowchart of process steps of an operation performed by a control section of the digital television receiver according to the first embodiment of the present invention.

FIG. 4 is a flowchart of process steps of an operation performed by the control section of the digital television receiver according to the first embodiment of the present invention. This operation is performed in response to a command received by the control section 11.

In response to receipt of the control code outputted from the recognized voice processing section 33, the control section 11 records in the storage section 21 settings of the receiver body 1 that are active just before execution of the command associated with the control code (step S1) before the execution of the command and then executes the command according to the control code (step S2).

The "settings of the receiver body 1 that are active just before execution of the command" is meant to include channel setting and sound volume setting that are active just before execution of the command. The channel setting includes settings adjusted to physical channel numbers as well as settings adjusted to virtual channel numbers.

Subsequently, the control section 11 determines whether or not the user has uttered "UNDO" as the UNDO command (step S3). This determination is based on whether or not the control section 11 has received the special code outputted from the recognized voice processing section 33.

If it is determined that the user 2 has not uttered the UNDO command, the control section 11 determines whether or not any command has been inputted to the control section (step S4). This determination is based on whether or not the control section 11 has received any control code outputted from the recognized voice processing section 33.

If it is determined that any command has not been inputted to the control section 11, the control section 11 returns the process to step S3 to continue the process.

Alternatively, if it is determined that any command has been inputted to the control section 11, the control section 11 returns the process to step S1 to continue the process.

If it is determined in step S3 that the user 2 has uttered the UNDO command, the control section 11 instructs components of the receiver body 1 to perform respective UNDO operations for restoring the last settings stored in the storage section 21 from the current settings of the receiver body 1 (step S5).

In each of steps S2, S3 and S5, it is assumed that the selected channel of D-TV receiver 1 has been undesirably changed to channel 8 from channel 6 selected according to the last channel setting by the D-TV receiver having erroneously recognized a command given by the user 2 to increase the sound volume as a command to change the current channel to channel 8. In response to the UNDO command received by the D-TV receiver 1 upon utterance of "UNDO" by the user 2 (affirmative determination in step S3), the D-TV receiver 1 restores the last channel setting (channel 6) from the current channel setting (channel 8) (step S5).

Thus, the last settings can be restored easily by mere utterance of the UNDO command. Therefore, the user is not made to feel inconvenient any longer.

Subsequently, the control section 11 waits for input of some command (step S6) and then returns the process to step S1 to continue the process.

Description will be made of an optical disk device according to the second embodiment of the present invention.

Figure 5:
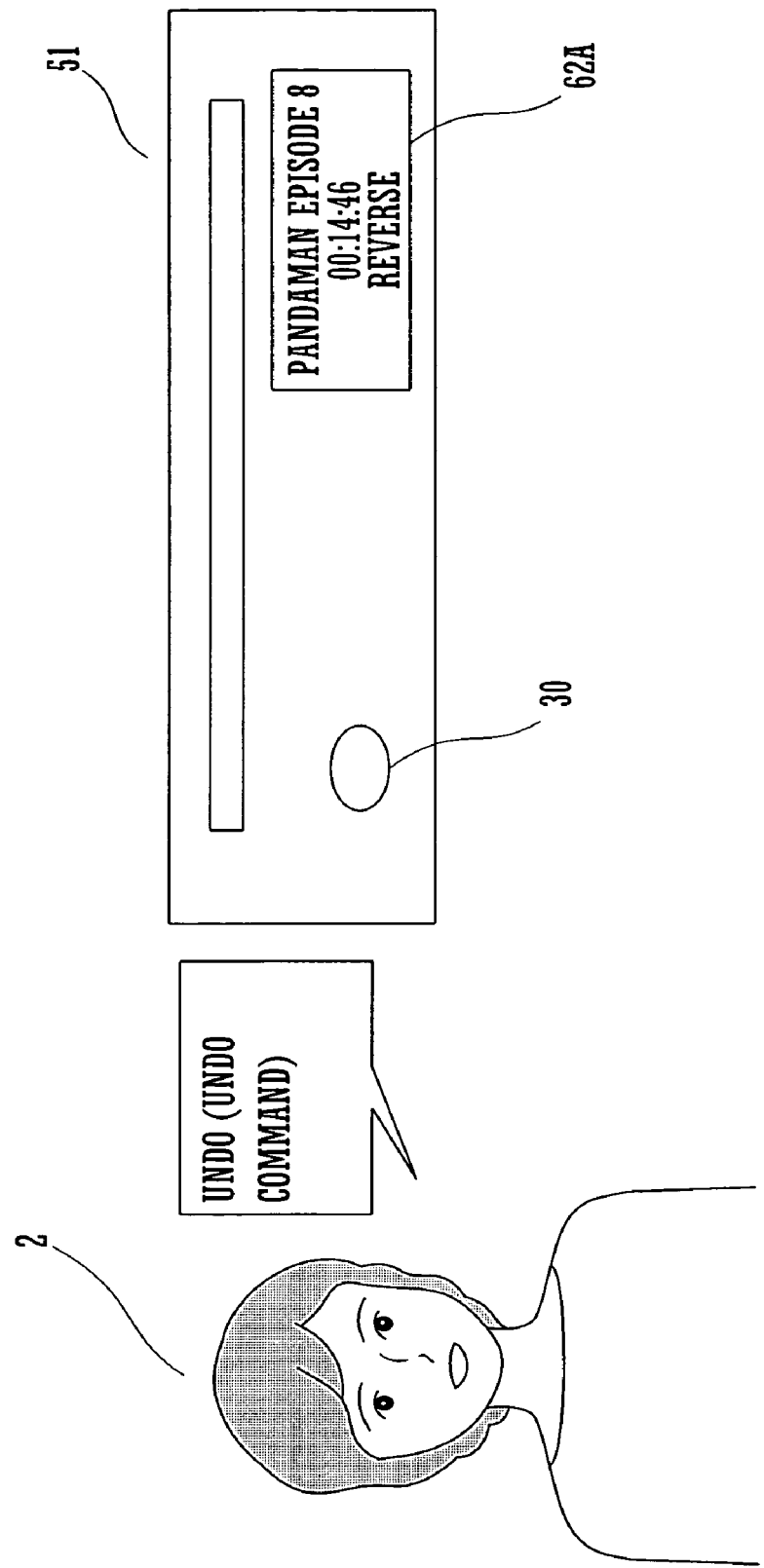
FIG. 5 is a conceptual view illustrating a state where the user utters "UNDO" as the UNDO command with respect to an optical disk device that has mistaken a command from the user for a wrong command by erroneous recognition.

FIG. 5 is a conceptual view illustrating a state where the user utters "UNDO" as the UNDO command with respect to an optical disk device that has mistaken a command from the user for a wrong command by erroneous recognition. The optical disk device 51 includes a LCD (Liquid Crystal Display) 62A configured to display video images, and a voice input section 30 comprising a microphone or the like for receiving voices.

The last trick play setting of the optical disk device 51 was "fast forward" and the location on the optical disk (medium) 70 at which the trick play (fast forward) was active at "Episode 8, 00:15:24" (see FIG. 9A to be referred to later).

However, the optical disk device 51 has mistaken a command given by the user 2 to perform replay for another command by erroneous recognition and is now performing "reverse" undesirably as shown in FIG. 5 (see FIG. 9B to be referred to later).

Then, the user 2 utters "UNDO" as an UNDO command. In response to the UNDO command received, the optical disk device 51 puts back the current setting ("reverse" at the location "Episode 8, 00:14:86") to the last setting ("fast forward" at the location "Episode 8, 00:15:24") (see FIG. 9C to be referred to later). Further, the optical disk device 51 stops the last trick play ("fast forward") (see FIG. 9D to be referred to later).

Thus, by mere utterance of the UNDO command by the user 2, the optical disk device 51 can undo the erroneously recognized command and perform replay from a location intended by the user. The flow of this operation will be described in detail below.

Figure 6:
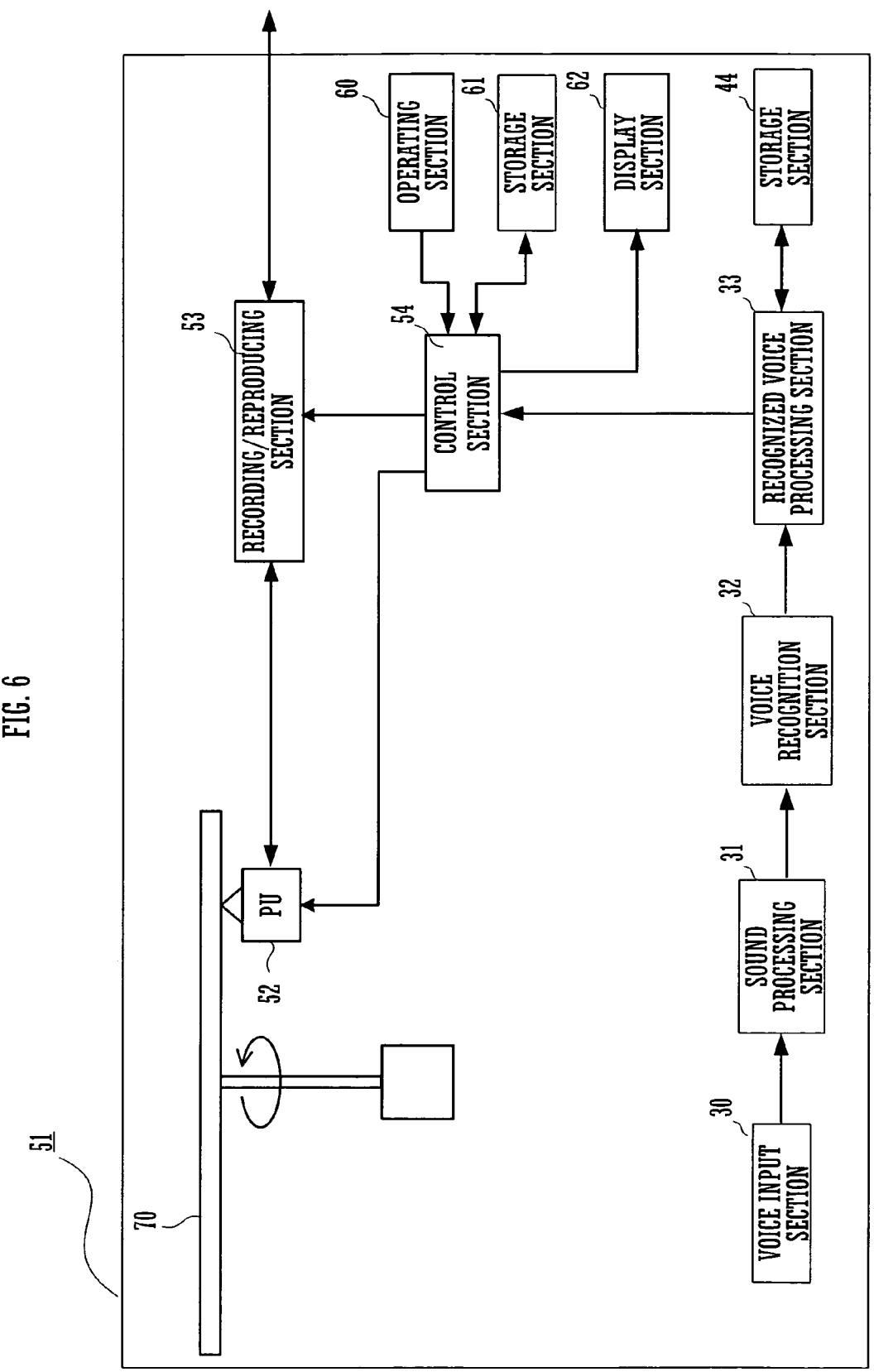
FIG. 6 is a block diagram showing a basic con-figuration of an optical disk device according to a second embodiment of the present invention.

FIG. 6 is a block diagram showing a basic configuration of the optical disk device according to the second embodiment of the present invention. The optical disk device 51 includes a pickup head 52 (hereinafter will be referred to as PU head 52), a recording/reproducing section 53 comprising a RF amplifier, an operating section 60 provided with a replay key and a record key, a display section 62, and a storage section 61 as a settings storage section.

The optical disk device 51 further includes a voice input section 30, a sound processing section 31, a voice recognition section 32, a recognized voice processing section 33, and a storage section 44 as a code storage section.

The aforementioned voice input section 30, sound processing section 31, voice recognition section 32 and recognized voice processing section 33 are each similar to the corresponding one of the D-TV receiver 1 shown in FIG. 2.

The PU head 52 includes non-illustrated components including a laser diode (LD), a collimator lens, a beam splitter, an objective lens, a photodetector, a thread motor, and an actuator.

The PU head 52 is movably mounted on a shaft extending radially of the optical disk 70. The thread motor moves the PU head 52 radially of the optical disk 70.

The LD is a light source configured to output laser light.

The objective lens adjusts the laser light irradiation point on the optical disk 70.

In the replay process, the PU head 52 irradiates the optical disk 70 with laser light of a power for reading and detects reflected light from the optical disk 70 by means of the photodetector.

In the recording process, on the other hand, the PU head 52 controls laser light of a power for recording in accordance with digital signals inputted from the recording/reproducing section 53 to irradiate the recording surface of the optical disk 70 with laser light.

In the replay process, the recording/reproducing section 53 generates RF signals based on the outputs of plural light-receiving elements of the PU head 52, and amplifies these RF signals. Subsequently, the recording/reproducing section 53 processes such RF signals to extract AV data therefrom and then decodes the AV data thus extracted. The AV data extracted here is data encoded by MPEG for example. Thereafter, the recording/reproducing section 53 converts the elongated data to analog replay signals and then outputs these replay signals to the exterior.

In the recording process, the recording/reproducing section 53 receives TV broadcasting signals via an antenna such as a TV antenna and digitizes these signals.

Subsequently, the recording/reproducing section 53 encodes the digitized AV data (by means of MPEG for example) and outputs the digitized signals to the PU head 52.

The operating section 60 is provided for the user 2 to input various commands to the optical disk device 51. Such a command inputted by the user 2 to the optical disk device 51 is transferred to the control section 54.

The display section 62 displays time, information on the current settings (including the current trick play setting and the location on the optical disk 70 at which the current trick play is proceeding), and like information on the LCD 62A (see FIG. 5 and FIGS. 9A to 9D to be referred to later).

The control section 54, which comprises a microcomputer for example, controls the components of the optical disk device 51 in accordance with a command inputted by the user 2 to the optical disk device 51.

Though tracking servo control and focus servo control are actually exercised in the reading and recording processes, description thereof is omitted from the description of this embodiment.

FIG. 7 is a table showing correspondences between words stored in the storage section 44 and control codes associated with the respective words. The storage section 44 comprises ROM for example.

The storage section 44 has stored therein correspondences between words and their respective associated control codes in a table form. Specifically, the storage section 44 has prestored therein control codes associated with respective of voices (words) each representing a command such as to power ON/OFF, perform replay or fast-forward or a like command. The storage section 44 has further prestored therein a special code associated with a voice (word "UNDO") representing the UNDO command to undo the former command.

In this embodiment, the special code are equivalent to the specified code defined by the present invention.

The recognized voice processing section 33 fetches the control code associated with a word (data) outputted by the voice recognition section 32 from the table stored in the storage section 44, and then outputs the code thus fetched to the control section 54. If the word outputted from the voice recognition section 32 is "REPLAY", the recognized voice processing section 33 fetches and outputs the control code "1110000111". Alternatively, if the word outputted from the voice recognition section 32 is "UNDO", the recognized voice processing section 33 fetches and outputs the special code "0000000111".

Figure 8:
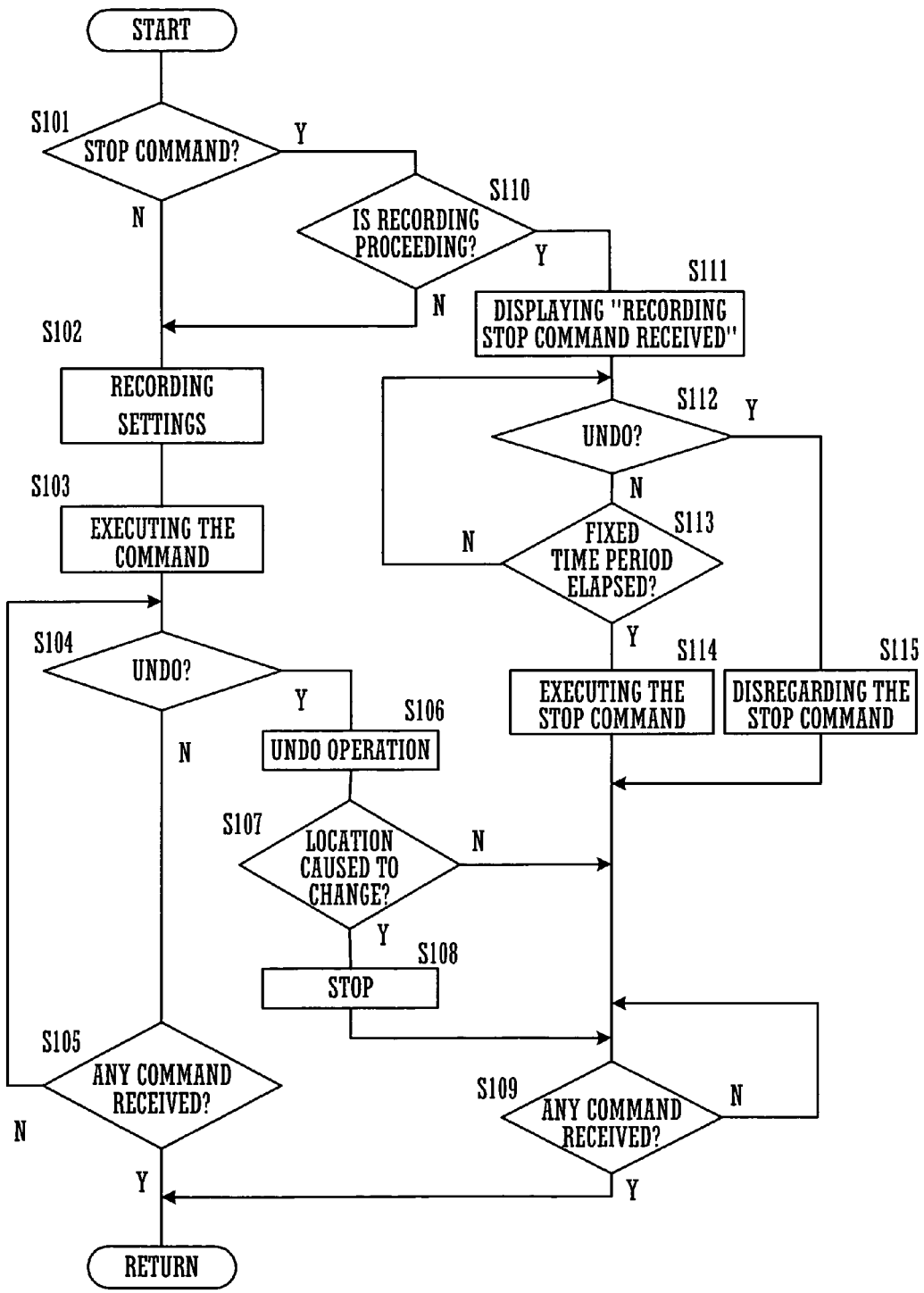
FIG. 8 is a flowchart of process steps of an operation performed by a control section of the optical disk device according to the second embodiment of the present invention.

FIG. 8 is a flowchart of process steps of an operation performed by the control section of the optical disk device according to the second embodiment of the present invention. This operation is performed in response to a command received by the control section 54. In response to receipt of any control code outputted from the recognized voice processing section 33, the control section 54 determines whether or not the command associated with this control code is a stop command (step S101). This determination is based on whether or not the control code received is "1110111111" representing the stop code (see FIG. 7).

If it is determined that the command received is the stop command, the control section 54 determines whether or not recording is proceeding currently (step S110).

In the case of affirmative determination in each of steps S101 and S110, it is assumed that the control section 54 receives the stop command during the recording process. In this case, the control section 54 does not immediately execute the stop command and continues recording in the background for a fixed time period (step S113 to be described later) while displaying information to the effect that the stop command has been received on the LCD 62A (step S111 to be described later). If there is no utterance of the UNDO command within the fixed time period (negative determination in step S112 to be described later), the control section 54 stops recording (step S114 to be described later). Alternatively, if there is an utterance of the UNDO command within the fixed time period (affirmative determination in step S112 to be described later), the control section 54 disregards the stop command (step S115 to be described later).

If the user 2 utters any command during a trick play other than recording in step S101 or S110, the control section 54 advances the process to step S102 to continue the process.

Figure 9A:
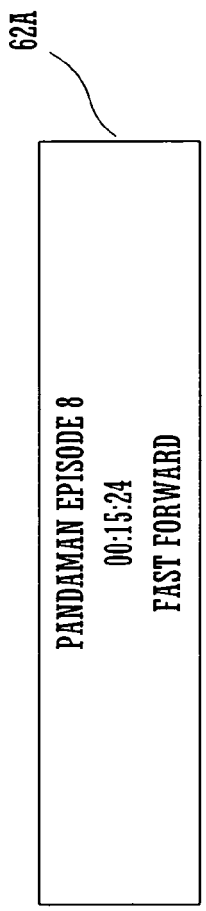
FIGS. 9A to 9D are representations each indicating one trick play displayed on LCD 62A and a location on optical disk 70 at which the trick play proceeds.
Figure 9B:
Figure 9C:
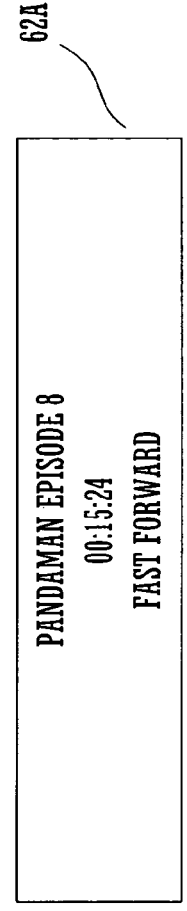
Figure 9D:
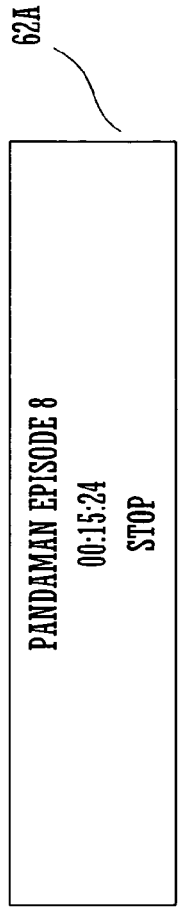

FIGS. 9A to 9D are representations each indicating one trick play displayed on the LCD 62A and a location on the optical disk 70 at which the trick play proceeds. Specifically, FIG. 9A is a representation indicating a trick play proceeding prior to the utterance of a command (to perform replay) by the user 2 and a location on the optical disk 70 at which the trick play proceeds at that time. FIG. 9B is a representation indicating a trick play proceeding after the utterance of the command (to perform replay) by the user 2 and a location on the optical disk 70 at which the trick play proceeds at that time. FIG. 9C is a representation indicating a trick play caused to proceed by the UNDO operation of the optical disk device 51 in response to an utterance of the UNDO command by the user 2 and a location on the optical disk 70 at which the trick play proceeds at that time. FIG. 9D is a representation indicating a trick play (stop) caused to proceed after the UNDO operation of the optical disk device 51 and a location on the optical disk 70 at which the trick play proceeds at that time.

If it is determined in step S101 that the command received is not the stop command, or if it is determined in step S110 that recording is not proceeding currently, the control section 54 records in the storage section 61 settings of the device body 51 that are active just before execution of the command prior to the execution of the command (step S102).

The expression "settings of the device body 51 that are active just before execution of the command" is meant to include a trick play setting that is active just before the execution of the command and a location on the optical disk 70 at which the trick play proceeds at that time. Such trick plays are operations of the device body and include "REPLAY", "SLOW REPLAY", "FAST FORWARD", "REVERSE", "PAUSE", and "STOP" for example. The "location" is a location of access on the optical disk 70. More specifically, the "location" is a location on the optical disk 70 irradiated with laser light, or a location at which the optical axis of laser light intersects the recording surface of the optical disk 70. An example of such a location is "PANDAMAN, EPIDODE 8, 00:15:24" displayed on the LCD 62A as shown in FIG. 9A.

In the case of step S102, it is assumed that the settings of the device body 51 that are active just before the execution of the command are settings ("FAST FORWARD" and "PANDAMAN, EPISODE 8, 00:15:24") as shown in FIG. 9A. In this case, the control section 54 records "FAST FORWARD" and "PANDAMAN, EPISODE 8, 00:15:24" in the storage section 61 (step S102).

Subsequently, the control section 54 executes the command received (step S103).

If the user 2 utters any other command than the stop command, for example, "REPLAY" during recording, the control section 54 disregards that command (step S103).

In the case of step S103, it is assumed that the optical disk device 51 has failed in voice recognition of, for example, the command ("REPLAY") uttered by the user 2 and the control section 54 causes "REVERSE" to proceed (step S103). In this case, the settings of the device body 51 are changed from, for example, the settings ("FAST FORWARD" and "PANDA-MAN, EPISODE 8, 00:15:24") shown in FIG. 9A to the settings ("REVERSE" and "PANDAMAN, EPISODE 8, 00:14:46") shown in FIG. 9B.

Subsequently, the control section 54 determines whether or not the user 2 has uttered the UNDO command (step S104). This determination is based on whether or not the control section 54 has received the special code outputted from the recognized voice processing section 33.

If it is determined that the user 2 has not uttered the UNDO command, the control section 54 determines whether or not any command has been inputted to the control section 54 (step S105). This determination is based on whether or not the control section 54 has received any control code outputted from the recognized voice processing section 33.

If it is determined that any command has not been inputted to the control section 54, the control section 54 returns the process to step S104 to continue the process.

Alternatively, if it is determined that any command has been inputted to the control section 54, the control section 54 returns the process to step S101 to continue the process.

If it is determined in step S104 that the user 2 has uttered the UNDO command, the control section 54 instructs components of the device body to perform respective UNDO operations for restoring the last settings stored in the storage section 61 from the current settings of the device body (step S106).

Here, it is assumed that the optical disk device 51 receives the UNDO command "UNDO" uttered by the user 2 (affirmative determination in step S104) and then restores the last settings from the current settings (step S106). In this case, the settings of the device body 51 are changed from, for example, the settings ("REVERSE" and "PANDAMAN, EPISODE 8, 00:14:46") shown in FIG. 9B to the settings ("FAST FORWARD" and "PANDAMAN, EPISODE 8, 00:15:24") shown in FIG. 9C.

However, the settings ("FAST FORWARD" and "PANDA-MAN, EPISODE 8, 00:15:24") resulting from the UNDO operation cause "FAST FORWARD" to be performed thereby changing the location on the optical disk 70. If the user 2 utters any command during fast forward, it is highly possible that the user 2 intends to stop fast-forwarding and wants the device to perform "REPLAY", "PAUSE" or a like trick play at the stopped location.

In order to prevent the stopped location from changing, the control section 54 performs steps S107 and S108 to be described later.

First, the control section 54 determines whether or not the trick play recorded in the storage section 61 is of the type which causes the location of access on the optical disk 70 to change like such a trick play as "REPLAY", "SLOW REPLAY", "FAST FORWARD" or "REVERSE" (step S107).

If it is determined that the trick play is of the type which causes the location of access on the optical disk 70 to change, the control section 54 instructs the components of the device body to "STOP" (step S108), waits for input of any command (step S109), and then returns the process to step S101 to continue the process.

By step S108, the settings of the device body 51 are changed from, for example, the last settings ("FAST FORWARD" and "PANDAMAN, EPISODE 8, 00:15:24") shown in FIG. 9C to the settings ("STOP" and "PANDAMAN, EPISODE 8, 00:15:24") shown in FIG. 9D.

Thus, the location of access fails to change after the UNDO operation and, hence, the optical disk device 51 can perform "REPLAY" or a like trick play from the location intended by the user.

If it is determined in step S107 that the trick play is not of the type which causes the location on the optical disk 70 to change, i.e., if the trick play is "STOP" or "PAUSE", the control section 54 waits for input of any command (step S109), and then returns the process to step S101 to continue the process.

Description will be made of a case where the optical disk 70 set on the optical disk device 51 is of the rewritable type and the optical disk device 51 has performed "RECORDING" not intended by the user 2 because of erroneous recognition of a command in step S103. If it is determined that the user 2 has uttered the UNDO command (affirmative determination in step S105), the control section 54 stops "RECORDING" and performs the last trick play to erase the undesirably recorded contents from the optical disk 70 for restoring the last settings (step S106).

Alternatively, if it is determined in step S110 that recording is proceeding currently, the control section 54 causes the LCD 62A to display information to the effect that the command to stop "RECORDING" has been received (step S111). Such information is "The command to stop recording has been received. The command will be executed in several seconds." or "Recording is now going to stop."

Subsequently, the control section 54 determines whether or not the user 2 has uttered the UNDO command (step S112). This determination is made in the same manner as in step S104. In the case of step S112, it is assumed that the user 2, informed from the display to the effect that the command to stop "RECORDING" has been received, utters the UNDO command to undo the recording stop command or does not utter the UNDO command because the user 2 intends to stop recording.

If it is determined that the user 2 has not uttered the UNDO command, the control section 54 determines whether or not a fixed time period has been elapsed from the time the information about the receipt of the command to stop "RECORDING" was displayed on the LCD 62A (step S113). The fixed time period is previously set to a time period sufficient to allow the user 2 to utter the UNDO command after having been informed of the receipt of the recording stop command. The fixed time period is 10 seconds for example.

After lapse of the fixed time period, the control section 54 executes the aforementioned stop command (step S114). Thereafter, the control section 54 waits for input of any command (step S109). In response to the input of any command, the control section 54 returns the process to step S101 to continue processing.

Alternatively, if it is determined in step S112 that the user 2 has uttered the UNDO command, the control section 54 disregards the aforementioned stop command (step S115). Thereafter, the control section 54 waits for input of any command (step S109). In response to the input of any command, the control section 54 returns the process to step S101 to continue processing.

While the optical disk device 51 according to this embodiment has been described as a representative of AV apparatus with the voice recognition function, the present invention is applicable to hard disk recorders with the voice recognition function.

A digital television receiver according to the third embodiment of the present invention will be described below.

Figure 11:
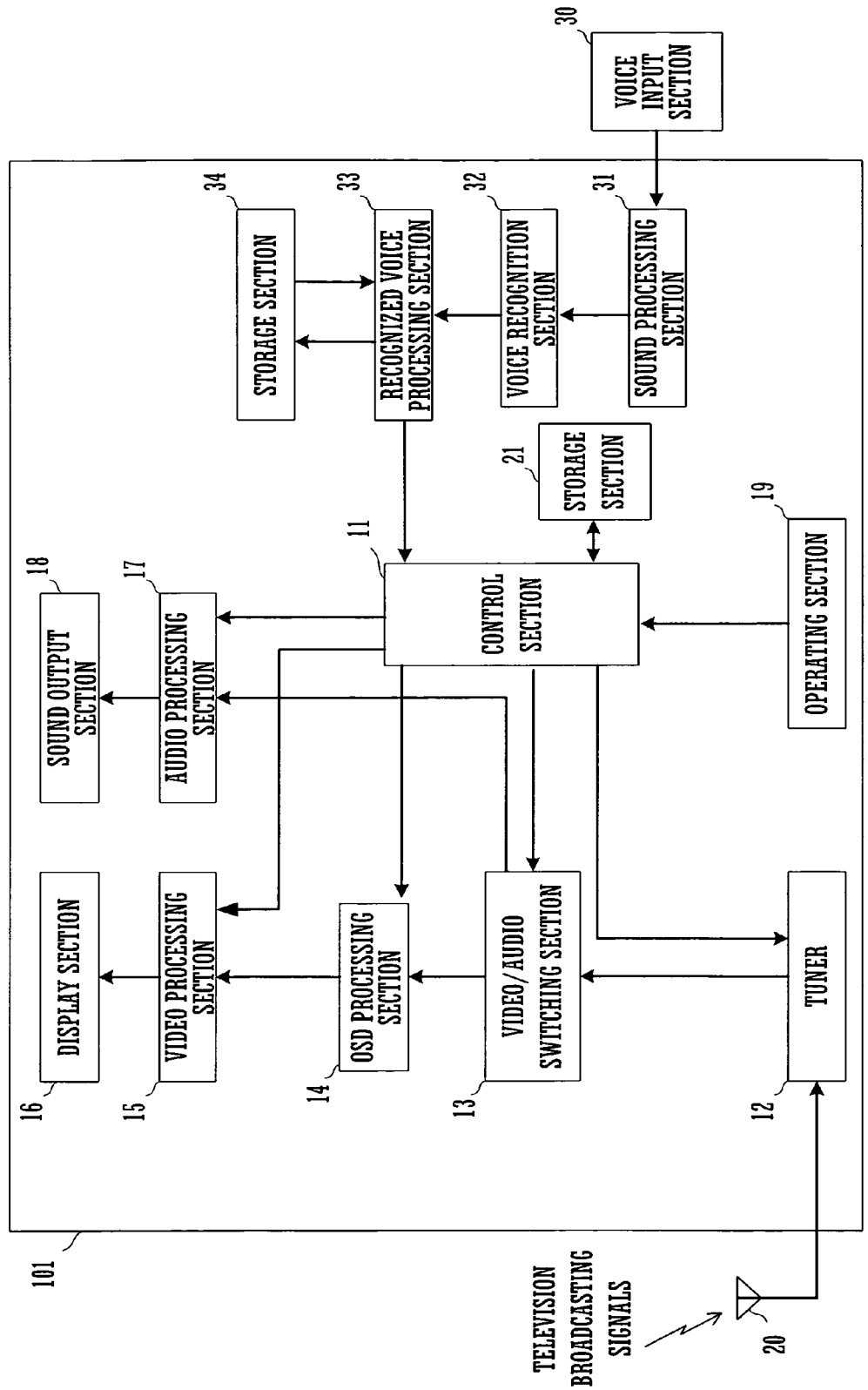
FIG. 11 is a block diagram showing a basic configuration of the digital television receiver according to the third embodiment of the present invention.

FIG. 10 is a view showing the outward appearance of the digital television receiver according to the third embodiment of the present invention. FIG. 11 is a block diagram showing a basic configuration of the digital television receiver according to the third embodiment of the present invention.

The D-TV receiver 101 shown in FIGS. 10 and 11 is different from the D-TV receiver 1 shown in FIG. 2 in that the voice input section 30 is located exteriorly of the cabinet of the D-TV receiver. The operation of the D-TV receiver 101 shown in FIGS. 10 and 11 is the same as that of the D-TV receiver 1 shown in FIG. 2.

A digital television receiver according to the fourth embodiment of the present invention will be described below.

Figure 12:
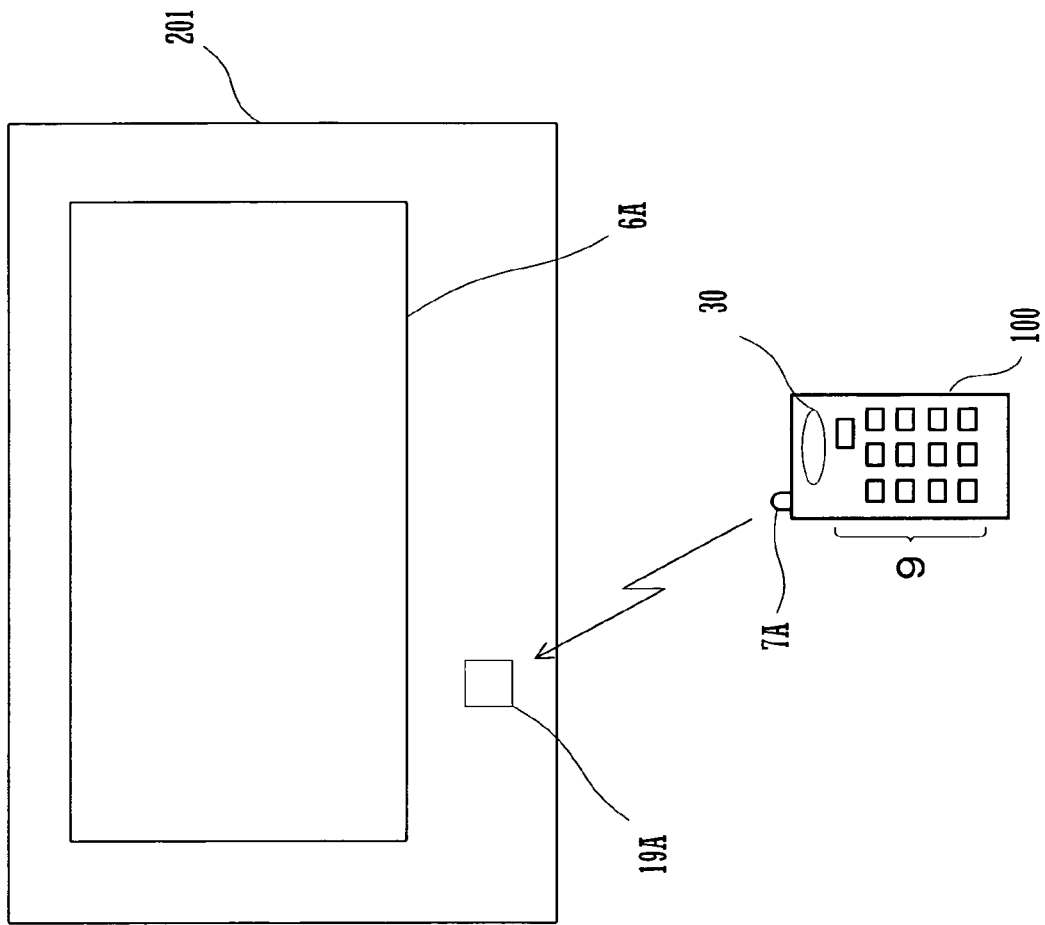
FIG. 12 is a view showing the outward appearance of a digital television receiver according to a fourth embodiment of the present invention.
Figure 13:
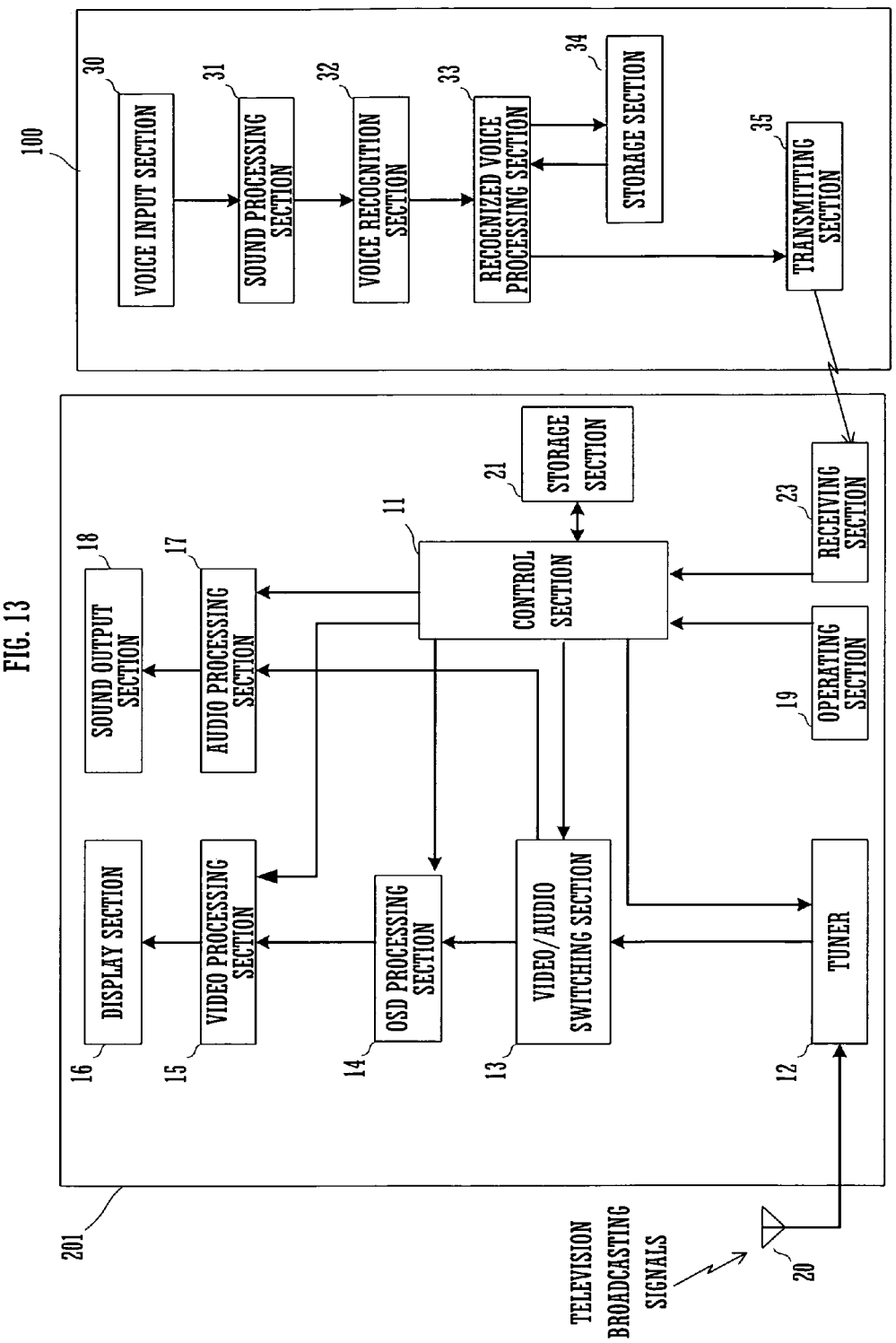
FIG. 13 is a block diagram showing a basic configuration of the digital television receiver according to the fourth embodiment of the present invention.

FIG. 12 is a view showing the outward appearance of the digital television receiver according to the fourth embodiment of the present invention. FIG. 13 is a block diagram showing a basic configuration of the digital television receiver according to the fourth embodiment of the present invention.

The D-TV receiver 201 shown in FIGS. 12 and 13 is different from the D-TV receiver 1 shown in FIG. 2 in that the D-TV receiver 201 is provided with a remote controller 100 for remote control of the D-TV receiver 201 and a receiving section 23 for receiving a control code or special code transmitted from the remote controller 100 (transmitting section 35).

The remote controller 100 includes a voice input section 30, a sound processing section 31, a voice recognition section 32, a recognized voice processing section 33, a storage section 34, and transmitting section 35 configured to transmit a control code or special code outputted from the recognized voice processing section 33.

With this embodiment, the user 2 utters voices against the voice input section 30 of the remote controller 100.

In this embodiment, the D-TV receiver 201 and the remote controller 100, as a whole, are equivalent to the AV apparatus defined by the present invention.

The operation of the D-TV receiver 201 shown in FIGS. 12 and 13 is the same as that of the D-TV receiver 1 shown in FIG. 2.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. An audio-visual apparatus with a voice recognition function comprising:
   a voice input section to which voices are inputted:
   a voice recognition section configured to recognize the voices;
   a code storage section having prestored therein a control code associated with a voice representing a first command to control an apparatus body, and a specified code associated with a voice representing an UNDO command to undo the first command;
   a recognized voice processing section configured to fetch the control code or the specified code associated with the voice recognized by the voice recognition section from the code storage section and output the control code or the specified code thus fetched;

a control section configured to instruct components of the apparatus body to perform respective operations for executing the first command according to the control code associated therewith upon receipt of the control code outputted from the recognized voice processing section; and a settings storage section configured to store therein settings of the apparatus body, wherein:

the control section records in the settings storage section settings of the apparatus body that are active before the execution of the first command as last settings before command execution and then executes the first command;

when the specified code outputted from the recognized voice processing section is received after the execution of the first command, the control section instructs the components of the apparatus body to perform respective UNDO operations for restoring the last settings stored in the settings storage section from the current settings of the apparatus body;

the control section determines whether a second command executed after instructing the components of the apparatus body to perform the respective UNDO operations, is FAST FORWARD or REVERSE; and when determining that the second command is FAST FORWARD or REVERSE, the control section instructs the components of the apparatus body to stop the second command.

2. The audio-visual apparatus according to claim 1, which is an optical disk device with a voice recognition function, or a hard disk recorder with a voice recognition function.

3. The audio-visual apparatus according to claim 1, wherein the control section records in the settings storage section the last settings before first command execution including last channel setting that is active before the execution of the first command, last sound volume setting that is active before the execution of the first command, last setting of the second command that is active before the execution of the first command, and a location on a medium at which the second command is executed before the execution of the first command.

4. The audio-visual apparatus according to claim 1, further comprising a remote controller, the remote controller having the voice input section, the voice recognition section, the code storage section, the recognized voice processing section, and a transmitting section configured to transmit the control code and the specified code outputted by the recognized voice processing section.

5. The audio-visual apparatus according to claim 1, further comprising a display section, wherein when the control section receives, during the recording process, the control code which represents a stop command which is one of the first command, the display section displays a receipt of the stop command, the control section:
continues recording even if receiving the stop command during the recording process;
stops recording if not receiving the specified code within a fixed time period displayed on the display section; and
disregards the stop command if receiving the specified code within the fixed time period.

* * * * *